(12) United States Patent
Sung et al.

(10) Patent No.: US 6,494,949 B2
(45) Date of Patent: Dec. 17, 2002

(54) PROCESS FOR THE PREPARATION OF BETA-PHASE QUINACRIDONE

(75) Inventors: Edward Sung, Cincinnati, OH (US); Kathleen M. Kozak, Fairfield, OH (US); George H. Robertson, Loveland, OH (US); Terrence R. Chamberlain, Cincinnati, OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/755,451

(22) Filed: Jan. 5, 2001

(65) Prior Publication Data

US 2002/0088377 A1 Jul. 11, 2002

(51) Int. Cl.$^7$ ................................................ C09B 48/00
(52) U.S. Cl. ............................ 106/497; 546/49; 546/56
(58) Field of Search ........................... 106/497; 546/49, 546/56

(56) References Cited

U.S. PATENT DOCUMENTS

| | | | |
|---|---|---|---|
| 2,969,366 A | 1/1961 | Griswold et al. | 260/279 |
| 3,257,405 A | 6/1966 | Gerson et al. | 260/279 |
| 3,287,147 A | 11/1966 | Wilkinson | 106/288 |
| 3,311,630 A | 3/1967 | Tessandori | 260/279 |
| 3,317,539 A | 5/1967 | Jaffe | 260/279 |
| 3,326,918 A | 6/1967 | West | 260/279 |
| 3,534,044 A | 10/1970 | Fessler | 260/279 |
| 3,547,926 A * | 12/1970 | Wagener | 106/497 |
| 3,697,464 A * | 10/1972 | Giambalvo et al. | 106/493 |
| 3,836,379 A | 9/1974 | Kirsch et al. | 106/288 |
| 3,940,399 A | 2/1976 | North | 260/279 |
| 4,099,980 A | 7/1978 | North | 106/288 |
| 4,857,646 A * | 8/1989 | Jaffe | 106/497 |
| 5,229,515 A * | 7/1993 | Pfenninger et al. | 546/49 |
| 5,281,269 A * | 1/1994 | Ganci et al. | 106/400 |
| 5,591,258 A | 1/1997 | Urban et al. | 106/497 |
| 5,755,874 A * | 5/1998 | Urban et al. | 106/495 |
| 5,989,333 A * | 11/1999 | Urban et al. | 106/159.1 |
| 6,090,196 A * | 7/2000 | Babler | 106/495 |
| 6,251,553 C1 | 6/2001 | Baur et al. | 430/106 |

FOREIGN PATENT DOCUMENTS

DE 1 150 046 6/1963
JP 60-32850 * 2/1985

OTHER PUBLICATIONS

W. Herbst, K. Hunger, Industrial Organic Pigments, Second Edition, p. 463 (no date).

* cited by examiner

Primary Examiner—Anthony J. Green
(74) Attorney, Agent, or Firm—Sidney Persley

(57) ABSTRACT

A process for producing beta-phase quinacridone by (a) reacting 2,5-dianilino-terephthalic acid with polyphosphoric acid in the presence of 2,5-dianisidino-terephthalic acid at a reaction temperature of at least 85° C.; (b) diluting the reaction mixture with water; (c) drowning the diluted mixture in a water-miscible alkanol; (d) heating the slurry at a temperature of from 100 to 130° C. at a pressure of 20 to 50 psi; and (e) recovering the beta-phase quinacridone.

10 Claims, 2 Drawing Sheets

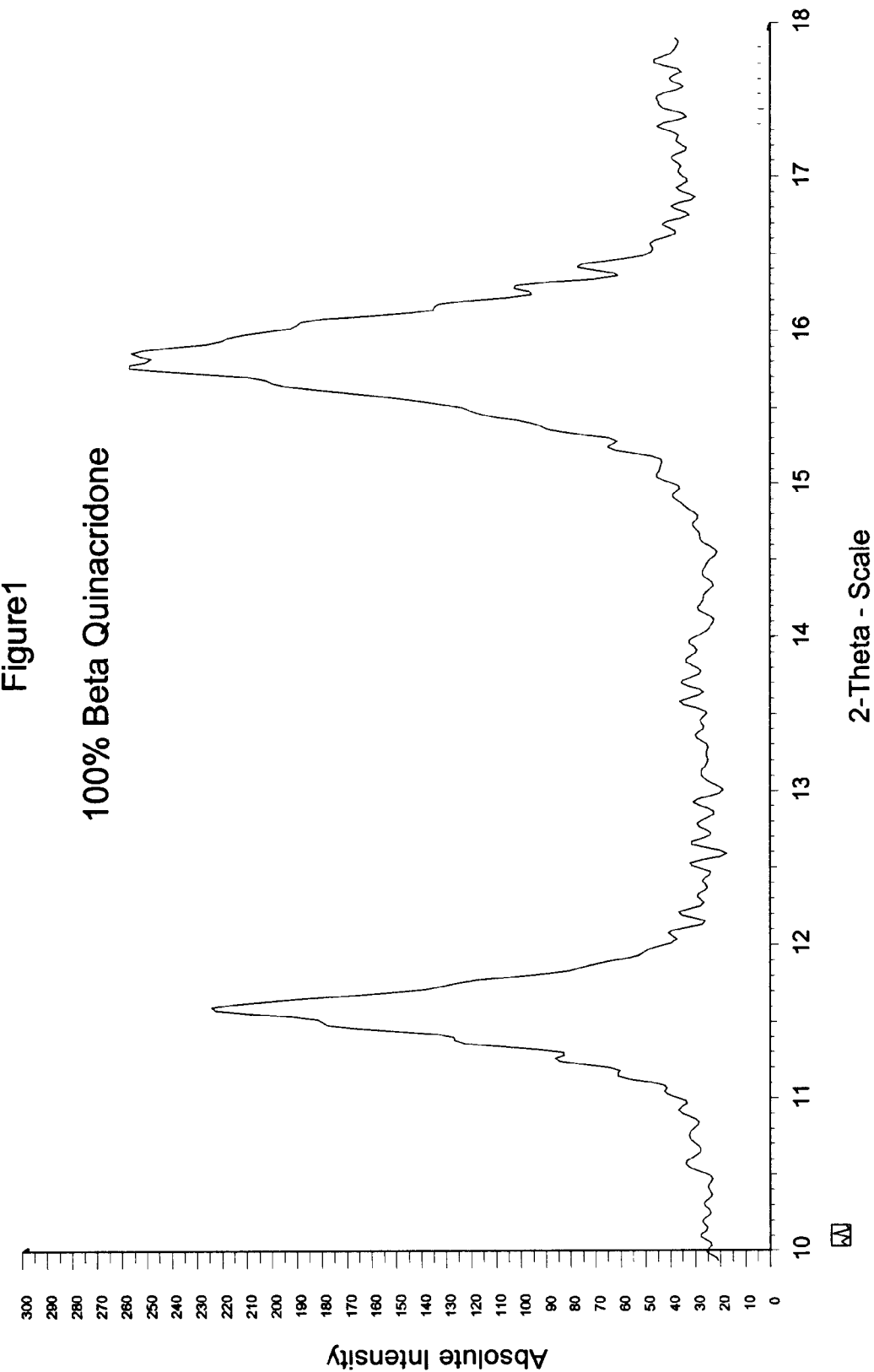

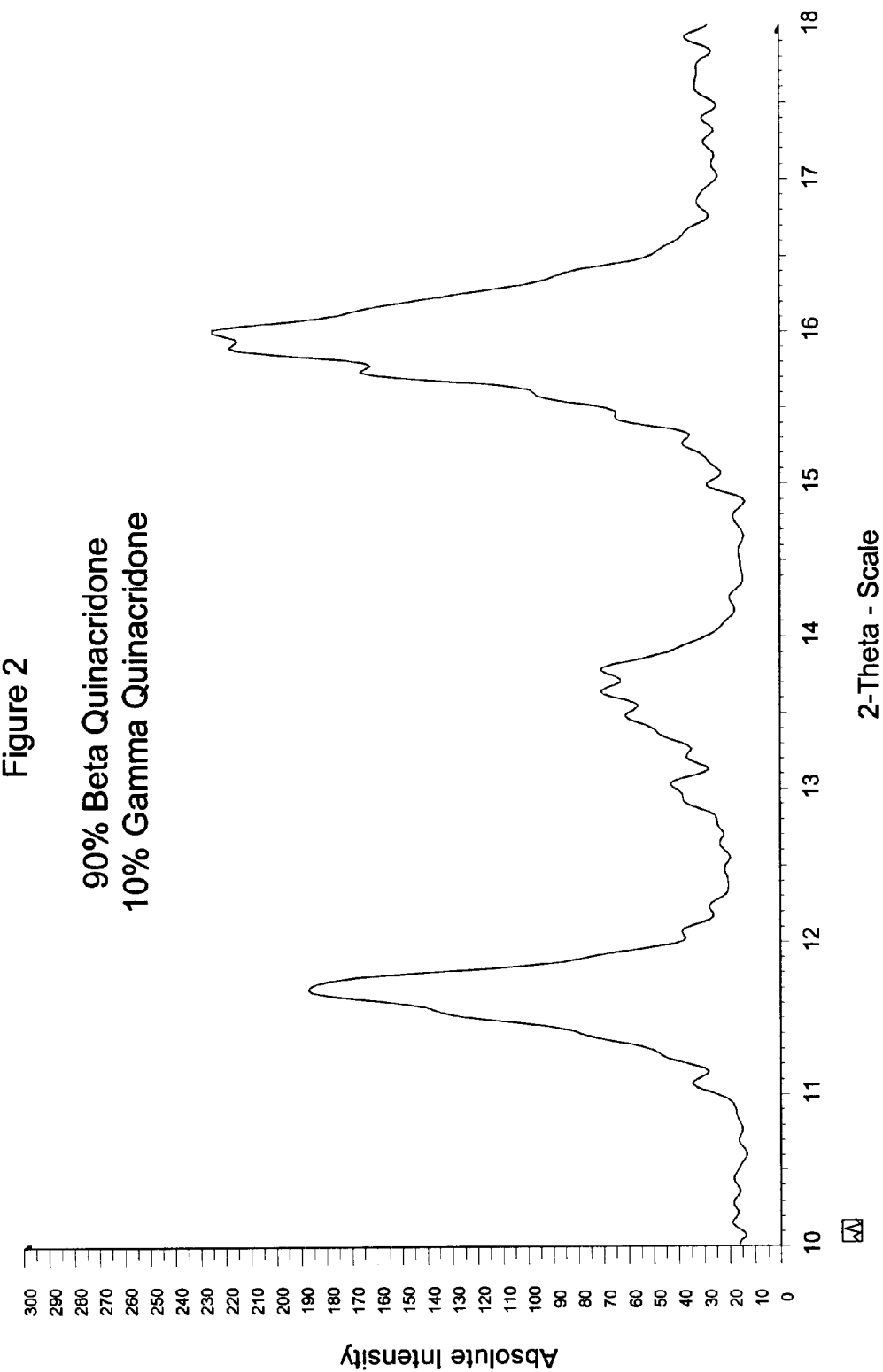

PROCESS FOR THE PREPARATION OF BETA-PHASE QUINACRIDONE

BACKGROUND OF THE INVENTION

1. Field of the Invention

The present invention relates to a process for producing substantially exclusively beta phase quinacridone.

2. Description of the Prior Art

U.S. Pat. No. 3,257,405 discloses the synthesis of quinacridone by ring closure of 2,5-diarylamino-terephthalic acids with at least 105% orthophosphoric acid ($H_3PO_4$) as a dehydrating or ring closing agent. The reaction mixture is cooled, drowned in water or alcohol, and filtered to produce a finely divided pigment. Examples 1 to 13 of this U.S. Patent illustrate the ring closure of 2,5-dianilino-terephthalic acid, while Example 16 illustrates the ring closure of 2,5-panisidino-terephthalic acid. See also U.S. Pat. No. 3,342,823.

U.S. Pat. No. 2,969,366 discloses that quinacridone and its derivatives can be produced in alpha, beta and gamma crystalline forms. However, it teaches that it is difficult to synthesize these compounds exclusively in a single crystalline form.

The beta and gamma forms of quinacridone are more stable than the alpha crystalline phase. Therefore, the prior art has sought methods to synthesize these pigments either entirely in one of the desired crystalline phases, or alternatively, through post-synthesis "conditioning" steps to convert crude quinacridone containing a mixture of crystalline phases to a single, desired, phase. For example, U.S. Pat. No. 3,311,630 discloses the production of beta-phase quinacridone by dissolving crude quinacridone in methylsulfonic acid and reprecipitating it by dilution with water. Similarly, U.S. Pat. No. 3,326,918 discloses producing beta-phase quinacridone by dissolving quinacridone in a mixture of an aromatic sulfonic acid and an organic solvent such as toluene, xylene and naphthalene, followed by precipitation into water.

U.S. Pat. No. 3,317,539 discloses the conversion of crude 2,9-dimethoxyquinacridone to the beta-phase by dry milling the crude with sodium chloride and treating with glacial acetic acid, or by milling with sodium chloride in the presence of tetrachloroethylene, xylene or orthodichlorobenzene.

U.S. Pat. No. 3,534,044 discloses the production of beta-phase quinacridone by milling a linear quinacridone of random or unspecified phase in an inorganic salt and formic, acetic, acrylic or substituted acetic acid until the beta-phase crystal modification is obtained.

U.S. Pat. No. 3,940,399 discloses a process for producing gamma-phase quinacridone pigment by heating a mixture of dianilino-terephthalic acid containing 10 to 20 weight (wt. %) percent of di(ortho substituted)anilino-terephthalic acid above 70° C. in polyphosphoric acid, and thereafter recovering the gamma quinacridone by adding water to the mixture. The ortho substituents include halogens, alkyl, alkoxy, halogenated alkyl, and tri-halogenated alkyl.

Herbst and Hunger, *Industrial Organic Pigments* 463 (2nd ed. 1997) teaches that under certain conditions, unsubstituted quinacridones and various substituted quinacridones mix with each other within the crystalline lattice to form solid solutions. These solid solution are different from both the physical admixture of such compounds and from the individual compounds themselves, often giving unexpected and unpredictable tinctorial results and/or pigmentary properties.

An object of the present invention is to economically produce a substantially pure form of beta-phase quinacridone, having an intense blue shade, by employing a minimum amount of polyphosphoric acid as the synthesis reagent.

It is a feature of this invention that the beta-phase quinacridone is produced by ring closure of 2,5-dianilino-terephthalic acid in the presence of a small amount of 2,5-panisidino-terephthalic acid (e.g. along with the polyphosphoric acid). It is an advantage of this invention that the amount of polyphosphoric acid employed is kept to a minimum and that the beta-quinacridone produced does not require a post-synthesis conditioning step. Relatively large amounts of polyphosphoric acid is disfavored as it must be disposed of after the synthesis.

SUMMARY OF THE INVENTION

In one aspect, the present invention is a process for producing beta-phase quinacridone, comprising (i) reacting 1 part by weight of 2,5-dianilino-terephthalic acid with 2.5 to 7 parts by weight polyphosphoric acid, having an acid content of at least 100% measured as $H_3PO_4$, in the presence of 2,5-dianisidino-terephthalic acid at a reaction temperature of at least 85° C. thereby producing a quinacridone reaction mixture;

(ii) diluting said reaction mixture with 0.05 to 1.0 parts by weight water, thereby producing a diluted mixture;

(iii) drowning said diluted mixture in a water-miscible $C_{1-C6}$ alkanol thereby producing a slurry;

(iv) heating said slurry to a temperature of from about 100 to about 130° C. at a pressure of from about 20 to about 50 pounds per square inch (psi); and (v) recovering said beta-phase quinacridone product.

In another aspect, the present invention relates to a quinacridone composition, wherein the quinacridone pigment is substantially pure in the beta-phase, containing from 1 to 20 wt. % 2,5-dianisidino-terephthalic acid, based on total weight of the composition, exhibiting an absorption band at 1213 $cm^{-1}$ (analyzed by dispersive infrared spectroscopy).

BRIEF DESCRIPTION OF THE DRAWINGS

FIG. 1 illustrates an X-ray diffraction pattern of a substantially pure beta-phase quinacridone crystal, taken at slow scan rate.

FIG. 2 illustrates an X-ray diffraction pattern of beta-phase and gamma-phase quinacridone mixed crystals in a 90:10 ratio, taken at slow scan rate.

DETAILED DESCRIPTION OF THE PREFERRED EMBODIMENTS

We have unexpectedly discovered that the presence of a small amount of commercially available 2,5-dianisidino-terephthalic acid in a reaction mixture to synthesize beta-phase quinacridone will produce substantially 100% beta-phase quinacridone rather than a crude mixture of beta and at least one alpha or gamma-phase crystalline (i.e. a polymorph). The resulting pigment has excellent heat stability and fastness properties and is believed to be suitable for use in plastics and automotive finishes.

The polyphosphoric acid employed as the ring-closing agent for the 2,5-dianilino-terephthalic acid, is a known viscous liquid composition and is a mixture of oxygen acids of pentavelent phosphorous, the principal components of which are condensation polymers, particularly linear polymers, of orthophosphoric acid.

Each of the component acids may be regarded as a chemical combination of water and pentavalent phosphorus ($P_2O_5$) in a characteristic stoichiometric ratio. In addition, the composition of the polyphosphoric acid may be defined in terms of the weight percentage of $P_2O_5$ equivalent to the mixture, based on total phosphorous content of the acid mixture determined by analysis (the "$P_2O_5$ equivalent"), or defined in terms of the related weight percent of $H_3PO_4$ equivalent to said mixture ("the acid content, measured as $H_3PO_4$.")

Polyphosphoric acids having a $P_2O_5$ equivalent of 82% to 84% (also sometimes called "tetraphosphoric acid") are available commercially. Thus, one commercially available polyphosphoric acid is a clear, colorless, viscous, hydroscopic liquid with a specific gravity of approximately 2.060 at 20° C. and a $P_2O_5$ equivalent of about 83% and an acid content, measured as $H_3PO_4$, of about 115%. Other polyphosphoric acids suitable for use with the present invention can be obtained from phosphorous pentoxide or from other phosphoric acids. Thus, phosphorous pentoxide can be converted to suitable polyphosphoric acids by reacting with water, with orthophosphoric acid, with partially dehydrated ortho-phosphoric acid, with a polyphosphoric acid of lower concentration. Alternatively, the orthophosphoric acid can be converted to a suitable polyphosphoric acid by heating to eliminate water. Furthermore, highly concentrated polyphosphoric acids can be diluted to the desired concentration with water or with aqueous phosphoric acids (e.g. ordinary syrupy $H_3PO_4$). Sufficient mixing and heating should be used to obtain a clear homogenous liquid.

The polyphosphoric acid is preferably employed in an amount ranging from about 2.5 to about 7 parts by weight and more preferably from about 3 to about 5, parts by weight, and has an acid content measured as $H_3PO_4$ of at least 100%, preferably 114 to 120%. All ranges set out herein, including those in the appended claims, include the limits hereof.

The 2,5-dianisidino-terephthalic acid may be present in an amount ranging from about 1 to about 20 wt. %, preferably 5 or less wt. %, based on the weight of 2,5-dianilino-terephthalic acid.

The ring closure reaction between 2,5-dianilino-terephthalic acid and polyphosphoric acid producing crude quinacridone is well known. The reactants may be mixed together prior to heating, or one or the other may be added to the reaction vessel after the other has been heated. In any event, the mixture is heated to at least 85° C., preferably 105 to 200° C. and maintained within the temperature range with stirring until the reaction is complete.

The duration of the heating step will depend upon the reaction conditions employed; i.e. such as the reaction temperature, concentration of polyphosphoric acid, and proportion of polyphosphoric acid to the 2,5-dianilino-terephthalic. In general, the duration of heating varies inversely with the temperature. At 120° C. to 200° C., a heating duration of 10 to ½ hours respectively is generally adequate.

Once the ring-closure reaction is complete, the reaction mixture is cooled and diluted with water, typically 0.05 to 1.0 parts by weight. The diluted mixture is then added to a large excess of a water miscible, low-boiling $C_1$–$C_6$ alkanol to produce a slurry. Suitable low-boiling alkanols include methanol, ethanol, n-propanol and isopropanol while methanol is preferred.

The slurry is then heated to a temperature ranging from about 100 to about 130° C. at a pressure of from 20–50 psi. The resulting quinacridone pigment is recovered from the slurry using conventional techniques, well known to those of ordinary skill in the art. For example, the slurry can be heated by refluxing the reaction mixture at a temperature of at least 105° C. for at least 2 hours. The beta-phase quinacridone product is then filtered off, washed to low conductivity, and dried to yield a substantially pure, very bluish quinacridone product.

Without intending to be bound by theory, we believe the product prepared according to the process of the present invention is a solid solution of beta-phase quinacridone and dimethoxyquinacridone. The pattern of X-ray diffraction is identical to that of pure beta-quinacridone. However, the product's dispersive infrared spectrum includes an absorption band at 1213 $cm^{-1}$, indicating the presence of a trace amount of dimethoxyquinacridone. The relative intensity of this band is believed to be directly proportional to the amount of dimethoxyquinacridone present.

The invention is illustrated in even more detail by the following specific examples, but those of ordinary skill in the art will understand that the invention is not limited to the details thereof and that changes may be made without departing from the scope of the invention.

EXAMPLE 1

Comparative Example 2,5-dianilino-terephthalic acid (one part) was dissolved in polyphosphoric acid (6.14 parts at 118.5%). The solution, already at 105° C., was heated to 133° C. for 3 hours then cooled to 100° C. and diluted to a fluid mass with water (0.5 parts). The solution was then drowned into methanol (11.6 parts) and the mixture heated at 125° C. for one hour to obtain a bluish red beta-phase quinacridone pigment.

The pigment was found to give considerably opaque masstone in a paint evaluation. The pigment was analyzed by X-ray diffraction and proven to be a beta phase quinacridone exhibiting peaks at 2θ angles of 5.65(s), 11.6(w), 15.9(w), 18.45(vw), 21.95(w), 23.45(vw), 26.0(vw), and 27.05(s). In a slow rate scan, there is no peak indicated at 2θ angles of 13.70, as shown in FIG. 1. The dispersive infrared spectroscopy was identical to that of a known pure quinacridone standard prepared in potassium bromide powder at 1% concentration.

At 6.14 parts of polyphosphoric acid, the synthesis required a large amount of polyphosphoric acid in order to obtain substantially pure beta-phase quinacridone.

EXAMPLE 2

A mixture (one part) of 2,5-dianilino-terephthalic acid (80 wt. %) and 2,5-dianisidino-terephthalic acid (20 wt. %) was dissolved in polyphosphoric acid (6.14 parts at 118.5%). The solution, already at 110° C., was heated to 130° C. for 3 hours, cooled to 100° C. and diluted to a fluid mass with water (0.5 parts). The solution was drowned into methanol (11.6 parts) and heated at 120° C. for 4 hours. A very bluish, transparent quinacridone pigment was obtained.

The pigment had the same X-ray diffraction pattern as that described in Example 1 and illustrated in FIG. 1. However. although the dispersive infrared spectroscopy was also similar to that of pure quinacridone, it exhibited an additional strong band at 1213 $cm^{-1}$ (which was indicative of dimethoxyquinacridone being present).

EXAMPLE 3

A mixture (one part) of 2,5-dianilino-terephthalic acid (95%) and 2,5-dianisidino-terephthalic acid (5%) was dissolved in polyphosphoric acid (6.14 parts at 118.5%). The solution, already at 100° C., was heated to 133° C. for 3 hours, cooled and diluted. The solution was drowned into methanol (11.6 parts) and heated at 120° C. for 4 hours. A very bluish, transparent quinacridone pigment, dispersible in an automotive finish, was obtained.

The pigment had the same X-ray diffraction pattern as that described in Example 1. The dispersive infrared spectroscopy was similar to that of a pure quinacridone but exhibited an additional absorption band at 1213 cm-1. The size of this band was about 3 times smaller than that in Example 2.

EXAMPLE 4

Comparative Example 2,5-dianilino-terephthalic acid (one part) was dissolved in polyphosphoric acid (4 parts at 117.5%). The solution, already at 110° C., was heated to 133° C. for 3 hours, cooled to 110° C. and diluted to a fluid mass with water (0.1 parts). The solution was then drowned into methanol (9.4 parts) and heated at 120° C. for 2 hours to produce a transparent blue shade pigment.

The pigment was analyzed and the X-ray diffraction pattern (FIG. 2) shows a mixture of beta and gamma crystals in a 90:10 ratio. The slow scan rate exhibited peaks at a 22 angle of 13.70 derived from the gamma-phase and at a 22 angle of 15.9 derived from the beta-phase.

The example illustrates that reducing the amount of polyphosphoric acid under conventional synthesis techniques will lead to the formation of an undesirable mixed-phase quinacridone reaction product.

EXAMPLE 5

A mixture of 2,5-dianilino-terephthalic acid (97%) and 2,5-dianisidino-terephthalic acid (3%) was dissolved in polyphosphoric acid (4 parts at 117.5%). The solution, already at 95° C., was heated to 133° C. for 3 hours, cooled to 110° C. and diluted with water (0.1 part). The solution was added to methanol (9.4 parts) and heated for 2 hours at 120° C. to produce a pure beta-phase pigment suitable for use in various high performance applications.

The X-ray diffraction spectrum for the product exhibited peaks at 22 angles of 5.65(s), 11.6(w), 15.9(w), 18.45(vw), 21.95(w), 23.45(vw), 26.0 (vw), and 27.05(s), thus confirming it to be a pure beta-phase quinacridone.

The example demonstrates that the amount of polyphosphoric acid can be reduced and a substantially pure beta-phase quinacridone produced, by including a minor amount of 2,5-dianisidino-terephthalic acid.

EXAMPLE 6

A mixture (one part) of 2,5-dianilino-terephthalic acid (96%) and 2,5-dianisidino-terephthalic acid (4%) was dissolved in polyphosphoric acid (4 parts at 117.5%). The solution was heated and drowned into methanol as described in Example 3. The mixture was then heated for 4 hours at 112° C. to produce a transparent, beta-phase quinacridone pigment, which exhibited an X-ray diffraction spectrum identical to that of Examples 5 thus confirming the product to be a pure beta-phase quinacridone.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A process for producing β-phase quinacridone, comprising:
   (i) reacting 1 part by weight of 2,5-dianilino-terephthalic acid with 2.5 to 7 parts by weight polyphosphoric acid, having an acid content of at least 100% measured as $H_3PO_4$, in the presence of 2,5-dianisidino-terephthalic acid at a reaction temperature of at least 85° C. thereby producing a quinacridone reaction mixture;
   (ii) diluting said reaction mixture with 0.05 to 1.0 parts by weight water, thereby producing a diluted mixture;
   (iii) drowning said diluted mixture in a water-miscible $C_1$–$C_6$ alkanol thereby producing a slurry;
   (iv) heating said slurry to a temperature of from about 100 to about 130° C. at a pressure of about 20 to about 50 psi; and
   (v) recovering said β-phase quinacridone product.

2. The process of claim 1 wherein said polyphosphoric acid is present in from 3 to 5 parts by weight.

3. The process of claim 2 wherein said polyphosphoric acid has an acid content, measured as $H_3PO_4$ of about 114 to about 120%.

4. The process of claim 1 wherein said 2,5-dianisidino-terephthalic acid is present from about 1 to about 20 wt. %.

5. The process of claim 1 wherein said reaction temperature is about 105 to about 140° C., and the reaction mixture is cooled prior to diluting.

6. The process of claim 1 wherein said water-miscible $C_1$–$C_6$ alkanol is selected from the group consisting of methanol, ethanol, n-propanol and isopropanol.

7. The process of claim 1 wherein said heating step is carried out by refluxing said reaction mixture at a temperature of at least 105° C. for at least 2 hours.

8. The process of claim 1 wherein said β-phase quinacridone recovery is carried out by filtering said slurry thereby producing a residue then washing said residue.

9. A quinacridone composition, wherein the quinacridone is substantially pure in the β-phase, containing from about 1 to about 20 wt. % of 2,5-dianisidino-terephthalic acid and exhibiting an absorption band at 1213 $cm^{-1}$.

10. The quinacridone composition of claim 9 wherein the amount of said 2,5-dianisidino-terephthalic acid is about 5 wt. % or less.

* * * * *